United States Patent
Lu et al.

(10) Patent No.: US 11,960,521 B2
(45) Date of Patent: Apr. 16, 2024

(54) TEXT CLASSIFICATION SYSTEM BASED ON FEATURE SELECTION AND METHOD THEREOF

(71) Applicant: Nanjing University of Posts and Telecommunications, Nanjing (CN)

(72) Inventors: Yin Lu, Nanjing (CN); Qingyuan Li, Nanjing (CN); Abdusamjan Abdukirim, Nanjing (CN); Jie Hu, Nanjing (CN); Luocheng Wu, Nanjing (CN); Yongan Guo, Nanjing (CN)

( * ) Notice: Subject to any disclaimer, the term of this patent is extended or adjusted under 35 U.S.C. 154(b) by 0 days.

(21) Appl. No.: 18/097,329

(22) Filed: Jan. 16, 2023

(65) Prior Publication Data
US 2023/0214415 A1    Jul. 6, 2023

(30) Foreign Application Priority Data
May 5, 2022   (CN) .......................... 202210479218.4

(51) Int. Cl.
*G06F 16/35* (2019.01)
*G06F 16/31* (2019.01)

(52) U.S. Cl.
CPC ............ *G06F 16/35* (2019.01); *G06F 16/313* (2019.01)

(58) Field of Classification Search
CPC ................................ G06F 16/35; G06F 16/313
See application file for complete search history.

(56) References Cited

U.S. PATENT DOCUMENTS

| | | | |
|---|---|---|---|
| 8,533,194 B1* | 9/2013 | Ravid ................... | G06N 20/10 |
| | | | 707/736 |
| 2015/0063688 A1 | 3/2015 | Bhardwaj | |
| 2016/0098608 A1 | 4/2016 | Bhardwaj et al. | |
| 2018/0068231 A1* | 3/2018 | Sharma ................... | G06F 16/35 |
| 2018/0357531 A1 | 12/2018 | Giridhari | |
| 2020/0202181 A1* | 6/2020 | Yadav ................... | G06F 16/35 |
| 2021/0286835 A1* | 9/2021 | Wang ................... | G06F 40/117 |
| 2021/0334468 A1* | 10/2021 | Yu ......................... | G06F 40/30 |
| 2022/0035877 A1* | 2/2022 | Nittur Sridhar ....... | G06N 3/086 |
| 2023/0057706 A1* | 2/2023 | Malak ................... | G06F 40/20 |

* cited by examiner

*Primary Examiner* — Dangelino N Gortayo

(57) ABSTRACT

The present disclosure discloses a text classification system based on feature selection and a method thereof in the technical field of natural language processing and short text classification, comprising: acquiring a text classification data set; dividing the text classification data set into a training text set and a test text set, and then pre-processing the training text set and the test text set; extracting feature entries from the pre-processed training text set through improved chi-square statistics to form feature subsets; using TF-IWF algorithm to give the weight to the extracted feature entries; based on the weighted feature entries, establishing a short text classification model based on a support vector machine; and classifying the pre-processed test text set by the short text classification model. The present disclosure solves the problem that the short text content is sparse to some extent, thereby improving the performance of short text classification.

6 Claims, 2 Drawing Sheets

TEXT CLASSIFICATION SYSTEM BASED ON FEATURE SELECTION AND METHOD THEREOF

TECHNICAL FIELD

The present disclosure relates to a text classification system based on feature selection and a method thereof, belonging to the technical field of natural language processing and short text classification.

BACKGROUND

With the rapid development of the Internet, the number of Internet users in China continues to increase. Furthermore, with the rise of social network e-commerce platforms, information data is exploding exponentially, especially short text data.

The huge amount of information is a double-edged sword, which not only facilitates us to acquire information, but also brings unprecedented challenges to people. As we are in the midst of redundant information, how to quickly and accurately find the information we need is an urgent problem to be solved. These data are mainly in the form of short texts, and they play an increasingly important role in all walks of life. We are increasingly inseparable from short text messages. Moreover, these short texts can directly reflect people's attitudes towards events, have significance in public opinion analysis, and gradually evolve into a branch of natural language processing.

These messages are mainly short, which is quite different from ordinary texts and can be as short as a few words in length. What are the characteristics of short texts? The information is updated quickly, the real-time performance is high, the repetition rate of words is not high, the total amount is large, the new words appear frequently and irregularly, the semantic features are sparse, and the features are not obvious in the classification process. At present, the popular classification algorithm is suitable for long text classification, but the effect is not good when the classification algorithm is directly applied to short texts.

There are generally two methods to improve the accurate classification of short texts. One method is to introduce external corpora, expand corpora and enhance semantics so as to improve the classification accuracy, but the disadvantage is to rely on the quality of corpora. The other method is to obtain features by mining key information such as word frequency based on the features of the text itself, which is also feature selection, so as to improve the short text classification effect. Feature selection is also the feature dimensionality reduction in essence, because the vectorized text usually has the phenomenon of "dimensionality disaster". The effect of the feature words in which dimensionality has been reduced on classification needs to be reflected in the classification weight.

SUMMARY

The present disclosure aims to overcome the disadvantages in the prior art, provide a text classification system based on feature selection and a method thereof, and solve the problems of insufficient feature selection and small weight range of eigenvalues, so as to improve the accuracy of short text classification.

In order to achieve the above purpose, the present disclosure is realized by using the following technical scheme.

In a first aspect, the present disclosure provides a text classification method based on feature selection, comprising:

acquiring a text classification data set;

dividing the text classification data set into a training text set and a test text set, and then pre-processing the training text set and the test text set;

extracting feature entries from the pre-processed training text set through improved chi-square statistics to form feature subsets;

using TF-IWF algorithm to give the weight to the extracted feature entries;

based on the weighted feature entries, establishing a short text classification model based on a support vector machine; and classifying the test text set by the short text classification model.

Further, the pre-processing comprises first performing standard processing including removing stop words on the text, and then selecting Jieba word segmentation tool to segment the processed short text content to obtain the training text set and the test text set which have been segmented, and storing the training text set and the test text set in a text database.

Further, extracting feature entries from the pre-processed training text set through improved chi-square statistics to form feature subsets comprises:

extracting each feature item and its related category information from the text database;

calculating a word frequency adjustment parameter $\alpha(t, c_i)$, an intra-category position parameter $\beta$ and a negative correlation correction factor $\gamma$ of a feature word t with respect to each category;

using an improved formula to calculate the IMP_CHI value of an entry with respect to each category;

according to the improved chi-square statistics, obtaining the IMP_CHI value of a feature item t with respect to the whole training set;

after calculating the IMP_CHI values of the whole training set, selecting the first M words as the features represented by a document to form a final feature subset according to the descending order of the IMP_CHI values.

Further, the improved chi-square statistical formula is:

$$IMP\_CHI(t,c_j) = x^2(t,c_i) \times \alpha(t,c_j) \times \beta \times \gamma$$

where $\alpha(t,c_j)$ is a word frequency adjustment parameter, $\beta$ is an intra-category position parameter, $\gamma$ is a negative correlation correction factor, and $x^2(t,c_i)$ is the traditional calculation formula of chi-square statistics, which is expressed as:

$$x^2(t, c_i) = \frac{N \times (A \times D - C \times B)^2}{(A+C) \times (B+D) \times (A+B) \times (C+D)}$$

where N represents the total number of all texts in the training set, A is the text belonging to the category $c_i$ and containing the feature t, B is the text not belonging to the category $c_i$ and containing the feature t, C is the text belonging to the category $c_i$ and not containing the feature t, and D is the text not belonging to the category $c_i$ and not containing the feature t;

for multi-category problems, the statistical calculation method of the feature item with respect to the whole training set is expressed as:

$$IMP\_CHI_{max}(t) = \max_{j=1}^{m} \{IMP\_CHI(t, c_j)\}$$

where m is the number of categories.

Further, the calculation formula of the word frequency adjustment parameter $\alpha(t, c_j)$ is as follows:

$$\alpha(t, c_j) = \frac{N}{n} \times \frac{tf(r, c_i)}{\sum_{k=1}^{m} tf(t, c_i)}$$

where N represents the total number of all texts in the training set, n represents the number of documents containing the feature word t in the text set, $tf(t, c_i)$ represents the number of occurrences in the text of the category $c_i$, $\sum_{i=1}^{N} tf(t, c_i)$ represents the number of all the occurrences in the documents of all categories, the word frequency adjustment parameter $\alpha(t, c_i)$ represents calculating the ratio of the number of word frequencies of the feature item in each category to the total number of word frequencies of the feature item in all categories, and the larger value $\alpha(t, c_i)$ represents that the feature item appears in a certain category of the text set more frequently and the ability to discriminate the corresponding categories is stronger;

the calculation formula of the intra-category position parameter $\beta$ is as follows:

$$\beta_j = \frac{1}{m} \sum_{j=1}^{m} \left[ tf_j(t) - \frac{1}{m} \sum_{k=1}^{m} tf_j(t) \right]^2$$

which is normalized as:

$$\beta = 1 - \frac{\beta_j}{\sqrt{\sum_{j=1}^{m} \beta_j^2}}$$

where m represents the total number of the categories, and $tf_j(t)$ represents the word frequency of the feature word t in the category j;

the calculation formula of the negative correlation correction factor $\gamma$ is as follows:

$$\gamma = N(t, c_i) - \frac{\sum_{j=1}^{n} N(t, c_i)}{m}$$

where $N(t, c_i)$ is the number of texts in which the feature t appears in the category $c_j$, $\sum_{j=1}^{n} N(t, c_i)$ is the total number of texts in which t appears in the text set, and m is the number of categories.

Further, TF-IWF algorithm is used to give the weight to the extracted feature entries, wherein the word frequency TF refers to the frequency that a certain entry $t_i$ appears in the document $d_j$, which is generally normalized, and the calculation process is as follows:

$$TF_{ij} = \frac{n_{i,j}}{\sum_{k} n_{k,j}}$$

where $n_{i,j}$ represents the number of occurrences of the entry $t_i$ in the document $d_j$, and $\Sigma_k n_{k,j}$ represents the total number of occurrences of all entries in the text $d_j$;

the inverse word frequency IWF refers to the reciprocal of the proportion of the total number of words to the total number of documents, and the calculation process is as follows:

$$IWF_i = \log \frac{\sum_m n_i t_i}{n_i t_i}$$

where $\Sigma_m n_i t_i$ represents the total number of entries $t_i$ appearing in all documents in the category m, and $n_i t_i$ represents the number of entries $t_i$ appearing in the document $d_j$;

the TF-IWF value $W_{i,j}$ is obtained by multiplying the value of the word frequency $TF_{ij}$ by the value of the inverse word frequency $IWF_i$, and the calculation formula is as follows:

$$W_{i,j} = TF_{ij} \times IWF_i$$

In a second aspect, the present disclosure provides a text classification system based on feature selection, comprising:
a data acquisition module, which is configured to acquire a text classification data set;
a pre-processing module, which is configured to divide the text classification data set into a training text set and a test text set, and then pre-process the training text set and the test text set;
a Chi-square statistics module, which is configured to extract feature entries from the pre-processed training text set through improved chi-square statistics to form feature subsets;
a weighting module, which is configured to use TF-IWF algorithm to give the weight to the extracted feature entries;
a modeling module, which is configured to, based on the weighted feature entries, establish a short text classification model based on a support vector machine; and
a classification module, which is configured to classify the test text set by the short text classification model.

In a third aspect, the present disclosure provides a text classification device based on feature selection, comprising a processor and a storage medium;
wherein the storage medium is configured to store instructions;
the processor is configured to operate according to the instructions to perform the steps of the method according to any one of the above.

In a fourth aspect, the present disclosure provides a computer-readable storage medium on which a computer program is stored, wherein the program, when executed by a processor, implements the steps of the method according to any one of the above.

Compared with the prior art, the present disclosure has the following beneficial effects.

The present disclosure proposes a text classification method based on feature selection. Compared with the traditional CHI method, on the one hand, the present disclosure introduces word frequency adjustment parameters to reduce the influence of low-frequency word defects; introduces intra-category position parameters to improve the category discrimination of feature words in feature subsets; and introduces the negative correlation correction factor to prevent that feature words are more inclined to low-frequency noise words, which will affect the classification. On the other hand, when being combined with TF-IWF feature weighting algorithm, the feature words with strong classification ability are given different weights, solving the problem that the short text content is sparse to some extent, thereby improving the performance of short text classification.

DETAILED DESCRIPTION OF THE EMBODIMENTS

The present disclosure will be further described with reference to the accompanying drawings. The following embodiments are only used to illustrate the technical scheme of the present disclosure more clearly, rather than limit the scope of protection of the present disclosure.

Embodiment 1

Figure 1:
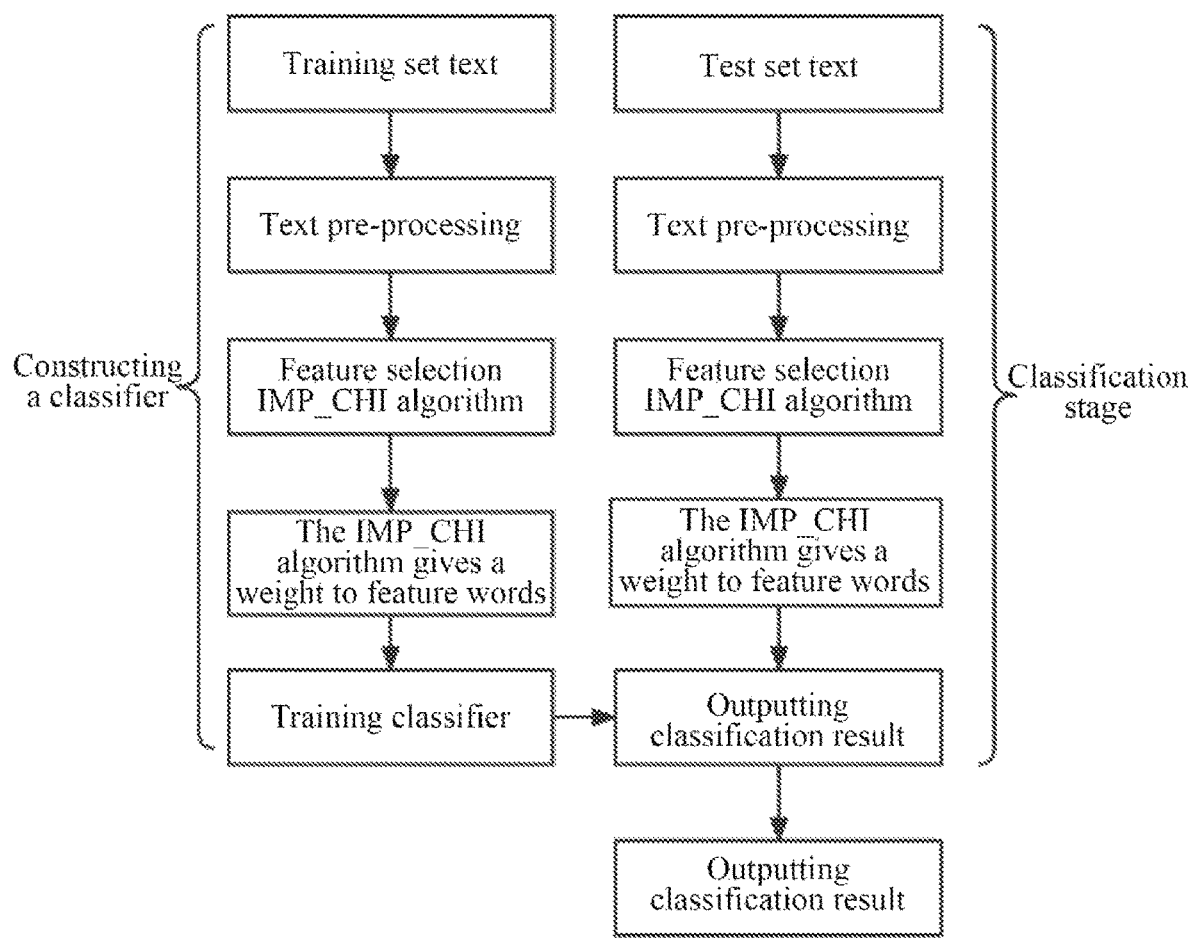
FIG. 1 is a flow chart of a method according to Embodiment 1 of the present disclosure.
Figure 2:
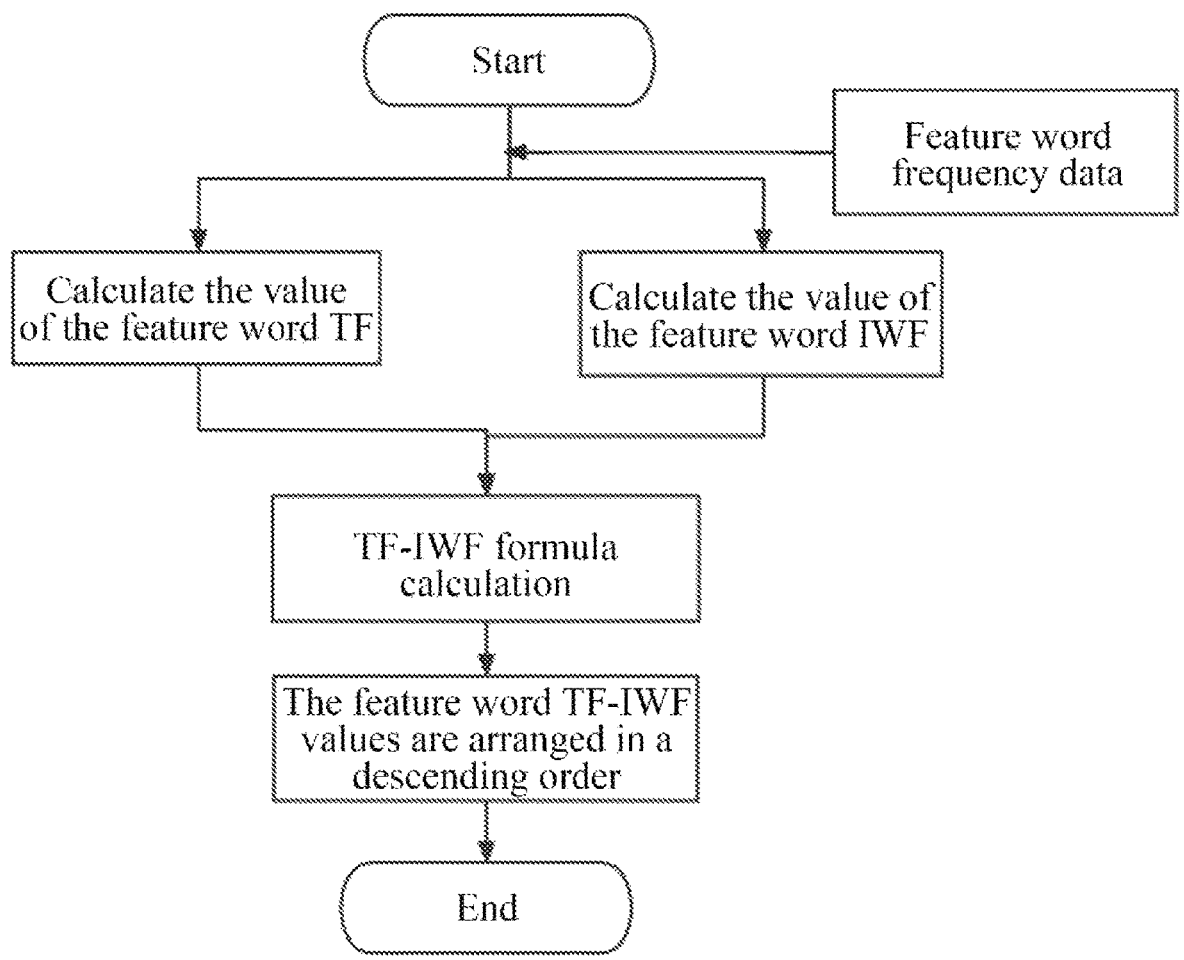
FIG. 2 is a flow chart of feature weighting according to Embodiment 1 of the present disclosure.

Referring to FIGS. 1-2, this embodiment discloses a text classification method based on feature selection. The present disclosure will be further described in detail through specific implementation schemes.

S1, a Chinese text classification data set THUCNews published by Tsinghua University Natural Language Processing Laboratory is downloaded from the Internet, which is divided into a training text set and a testing text set and is then pre-processed, wherein the pre-processing comprises Chinese word segmentation and stop words removal, so as to obtain the training set and the test set which have been segmented and store the training set and the test set in a text database.

The process of pre-processing the text is as follows: first performing a series of standard processing such as removing stop words on the text, and then selecting Jieba word segmentation tool to segment the processed short text content to obtain the training set and the test set which have been segmented, and storing the training set and the test set in a text database.

S2, aiming at the deficiency of the traditional chi-square statistics, a word frequency adjustment factor, an intra-category position parameter and a negative correlation correction factor are introduced.

The traditional chi-square statistical formula, that is, the CHI value of the feature item t and the category $c_i$ is as follows:

$$x^2(t, c_i) = \frac{N \times (A \times D - C \times B)^2}{(A+C) \times (B+D) \times (A+B) \times (C+D)}$$

where N represents the total number of all texts in the training set, A is the text belonging to the category $c_i$ and containing the feature t, B is the text not belonging to the category $c_i$ and containing the feature t, C is the text belonging to the category $c_i$ and not containing the feature t, and D is the text not belonging to the category $c_i$ and not containing the feature t. It can be seen from the above formula that when the feature t and the category $c_i$ are independent of each other, AD-CB=0. At this time, $x^2$(t, $c_i$)=0. The larger the value of $x^2(t, c_i)$, the more relevant the feature item t is to the category $c_i$.

There are three disadvantages of the traditional chi-square statistics.

1. The traditional Chi-square statistical method only consider the number of documents appearing in the document set, but do not consider the number of times that feature words appear in the text, exaggerating the function of low-frequency words, resulting in defects.

2. The traditional Chi-square statistical method does not consider the uniform distribution of feature words within the category.

3. The traditional Chi-square statistical method is more inclined to select the feature words negatively related to the category.

The word frequency adjustment parameter, the intra-category position parameter and the negative correlation correction factor are introduced.

1. The calculation formula of the word frequency adjustment parameters is as follows:

$$\alpha(t, c_j) = \frac{N}{n} \times \frac{tf(t, c_i)}{\sum_{i=1}^{n} tf(t, c_i)}$$

where N represents the total number of all texts in the training set, n represents the number of documents containing the feature word t in the text set, tf(t,$c_i$) represents the number of occurrences in the text of the category $c_i$, $\Sigma_{i=1}^{N}$tf (t,$c_i$) represents the number of all the occurrences in the documents of all categories, and the word frequency adjustment parameter $\alpha$(t,$c_i$) represents calculating the ratio of the number of word frequencies of the feature item in each category to the total number of word frequencies of the feature item in all categories. The larger value $\alpha$(t,$c_i$) represents that the feature item appears in a certain category of the text set more frequently and the ability to discriminate the corresponding categories is stronger.

2. The calculation formula of the intra-category position parameter is as follows:

$$\beta_j = \frac{1}{m} \sum_{j=1}^{m} \left[ tf_j(t) - \frac{1}{m} \sum_{i=1}^{m} tf_j(t) \right]^2$$

which is normalized as:

$$\beta = 1 - \frac{\beta_j}{\sqrt{\sum_{j=1}^{m} \beta_j^2}}$$

where m represents the total number of the categories, and $tf_j(t)$ represents the word frequency of the feature word t in the category j. With the idea of variance, the more uniform the intra-category distribution, the greater the $\beta$. By introducing the intra-category position parameter, the intra-category distribution of feature words is taken into account in the CHI feature selection, and the category discrimination of feature words in feature subsets is improved.

The calculation formula of the negative correlation correction factor is as follows:

$$\gamma = N(t, c_i) - \frac{\sum_{j=1}^{n} N(t, c_i)}{m}$$

where $N(t,c_i)$ is the number of texts in which the feature t appears in the category $c_j$, $\sum_{j=1}^{n} N(t,c_i)$ is the total number of texts in which t appears in the text set, and m is the number of categories. Therefore, when the number of texts in which the feature t appears in the category $c_j$ is less than the average number of texts in which t appears in each category, if the $\gamma$ value is negative, the CHI value will be negative. At this time, deleting the features negatively related to category $c_j$ can avoid the influence of the negative correlation on classification.

S3, feature subsets are formed through improved chi-square statistics.

In the traditional chi-square statistics, three concepts of word frequency adjustment parameters, intra-category position parameters and negative correlation correction factors are introduced. An improved method of chi-square statistics is proposed, which is named IMP-CHI (Improved-CHIsquare). The formula is expressed as follows:

$$IMP\_CHI(t,c_j) = x^2(t,c_i) \times \alpha(t,c_j) \times \beta \times \gamma$$

where $x^2(t,c_i)$ is the traditional calculation formula of chi-square statistics, $\alpha(t,c_j)$ is a word frequency adjustment parameter, $\beta$ is an intra-category position parameter, $\gamma$ is a negative correlation correction factor.

For multi-category problems, the statistical calculation method of the feature item with respect to the whole training set is expressed as:

$$IMP\_CHI_{max}(t) = \max_{j=1}^{m} \{IMP\_CHI(t,c_j)\}$$

where m is the number of categories. The above formula uses the idea of finding the maximum value, which can avoid such a problem: $t_1$ has a high correlation evaluation value in the category $c_1$, and has strong category information for such category of texts, but its evaluation value in other categories is very low, and the value is finally screened out because of not high total score, so that the classification effect is adversely affected.

The specific process of the IMP_CHI method can be summarized as follows.

The text in the text corpus is pro-processed, including word segmentation, part-of-speech tagging, removing special symbols and stop words, etc. The text words (title, keywords, abstract, text and category) are acquired and are placed into the initial set.

Each feature item and its related category information are extracted from the text database in sequence.

$\alpha(t,c_i)$, $\beta$ and $\gamma$ of a feature word t with respect to each category are calculated.

An improved formula is used to calculate the IMP_CHI value of an entry c with respect to each category.

According to the improved chi-square statistics, the IMP_CHI value of a feature item t with respect to the whole training set is obtained.

After calculating the IMP_CHI values of the whole training set, the first M words are selected as the features represented by a document to form a final feature subset according to the descending order of the IMP_CHI values.

S4, TF-IWF algorithm is used to give the weight to the extracted feature entries.

The TF-IWF algorithm is used to give the weight to the extracted feature entries, and the calculation process is as follows.

The word frequency TF refers to the frequency that a certain entry $t_i$ appears in the document $d_j$, which is generally normalized, and the calculation process is as follows:

$$TF_{ij} = \frac{n_{i,j}}{\sum_{k} n_{k,j}}$$

where $n_{i,j}$ represents the number of occurrences of the entry $t_i$ in the document $d_j$, and $\sum_{k} n_{k,j}$ represents the total number of occurrences of all entries in the text $d_j$.

The inverse word frequency $IWF_i$ refers to the reciprocal of the proportion of the total number of words to the total number of documents. The function of $IWF_i$ is to prevent words with high frequency but little effect on documents from obtaining higher weight. The calculation process is as follows:

$$IWF_i = \log \frac{\sum_{m} n_i t_i}{n_i t_i}$$

where $\sum_{m} n_i t_i$ represents the total number of entries $t_i$ appearing in all documents in the category m, and $n_i t_i$ represents the number of entries $t_i$ appearing in the document $d_j$.

The improved TF-IDF algorithm (that is, TF-IWF algorithm) is used. The TF-IWF value $W_{i,j}$ is obtained by multiplying the value $TF_{ij}$ by the value $IWF_i$, which is represented by $w_{i,j}$. The calculation formula is as follows:

$$W_{i,j} = TF_{ij} \times IWF_i$$

TF-IWF is used to filter common entries and give more weight to the entries that can better reflect the corpus. If a high-frequency entry in a text is in a low-frequency state in the text set, the TF-IWF value of the entry has a high weight.

S5, a support vector machine classifier is selected to classify the text to be tested.

A short text classification model based on a support vector machine is established. According to the trained classification model, the text data of the test set is input, the classification result is obtained, and its performance is evaluated. Experiments show that, compared with the traditional chi-square statistical method, the improved chi-square statistical method IMP_CHI proposed in the present disclosure can achieve better feature selection effect through the SVM classifier and significantly improve the performance of the classifier when being combined with TF-IWF feature extraction.

Embodiment 2

A text classification system based on feature selection can realize a text classification method based on feature selection according to Embodiment 1, comprising:

a data acquisition module, which is configured to acquire a text classification data set;

a pre-processing module, which is configured to divide the text classification data set into a training text set and a test text set, and then pre-process the training text set and the test text set;

a Chi-square statistics module, which is configured to extract feature entries from the pre-processed training text set through improved chi-square statistics to form feature subsets;

a weighting module, which is configured to use TF-IWF algorithm to give the weight to the extracted feature entries;

a modeling module, which is configured to, based on the weighted feature entries, establish a short text classification model based on a support vector machine; and a classification module, which is configured to classify the test text set by the short text classification model.

Embodiment 3

The embodiment of the present disclosure further provides a text classification device based on feature selection, which can realize the text classification method based on feature selection according to Embodiment 1, comprising a processor and a storage medium;

wherein the storage medium is configured to store instructions;

the processor is configured to operate according to the instructions to perform the steps of the method described hereinafter:

acquiring a text classification data set;

dividing the text classification data set into a training text set and a test text set, and then pre-processing the training text set and the test text set;

extracting feature entries from the pre-processed training text set through improved chi-square statistics to form feature subsets;

using TF-IWF algorithm to give the weight to the extracted feature entries;

based on the weighted feature entries, establishing a short text classification model based on a support vector machine; and classifying the pre-processed test text set by the short text classification model.

Embodiment 4

The embodiment of the present disclosure further provides a computer-readable storage medium which can realize the text classification method based on feature selection according to Embodiment 1, on which a computer program is stored, wherein the program, when executed by a processor, implements the steps of the method described hereinafter:

acquiring a text classification data set;

dividing the text classification data set into a training text set and a test text set, and then pre-processing the training text set and the test text set;

extracting feature entries from the pre-processed training text set through improved chi-square statistics to form feature subsets;

using TF-IWF algorithm to give the weight to the extracted feature entries;

based on the weighted feature entries, establishing a short text classification model based on a support vector machine; and classifying the pre-processed test text set by the short text classification model.

It should be understood by those skilled in the art that the embodiments of the present disclosure can be provided as methods, systems, or computer program products. Therefore, the present disclosure can take the form of an entirely hardware embodiment, an entirely software embodiment, or an embodiment combining software and hardware. Furthermore, the present disclosure may take the form of a computer program product implemented on one or more computer-available storage media (including but not limited to a disk storage, CD-ROM, an optical storage, etc.) in which computer-available program codes are contained.

The present disclosure is described with reference to flowcharts and/or block diagrams of methods, devices (systems), and computer program products according to the embodiments of the present disclosure. It should be understood that each flow and/or block in flowcharts and/or block diagrams and combinations of flows and/or blocks in flowcharts and/or block diagrams can be implemented by computer program instructions. These computer program instructions may be provided to the processor of a general-purpose computer, a special-purpose computer, an embedded processor or other programmable data processing devices to produce a machine, so that the instructions executed by the processor of the computer or other programmable data processing devices produce a device for implementing the functions specified in one or more flows in flowcharts and/or one or more blocks in block diagrams.

These computer program instructions can also be stored in a computer-readable memory that can direct a computer or other programmable data processing devices to work in a specific way, so that the instructions stored in the computer-readable memory produce an article of manufacture including an instruction device that implement the functions specified in one or more flows in flowcharts and/or one or more blocks in block diagrams.

These computer program instructions can also be loaded on a computer or other programmable data processing devices, so that a series of operation steps are executed on the computer or other programmable devices to produce a computer-implemented process, so that the instructions executed on the computer or other programmable devices provide steps for implementing the functions specified in one or more flows in flowcharts and/or one or more blocks in block diagrams.

The above are only the preferred embodiments of the present disclosure. It should be pointed out that for those skilled in the art, several improvements and variations can be made without departing from the technical principle of the present disclosure, which should also be regarded as the scope of protection of the present disclosure.

What is claimed is:

1. A text classification method based on feature selection, comprising:

acquiring a text classification data set;

dividing the text classification data set into a training text set and a test text set, and then pre-processing the training text set and the test text set;

extracting feature entries from the pre-processed training text set through an improved chi-square (IMP_CHI) statistical formula to form feature subsets;

using a Term Frequency-Inverse Word Frequency (TF-IWF) algorithm to give weights to the extracted feature entries;

based on the weighted feature entries, establishing a short text classification model based on a support vector machine; and classifying the pre-processed test text set by the short text classification model;

wherein the pre-processing comprises first performing standard processing including removing stop words on a text, and then selecting Jieba word segmentation tool to segment the processed short text content to obtain the training text set and the test text set which have been segmented, and storing the training text set and the test text set in a text database;

wherein extracting the feature entries from the pre-processed training text set through the improved chi-square statistical formula to form feature subsets comprises:

extracting each feature word t and its related category information from the text database;

calculating a word frequency adjustment parameter $\alpha(t, c_i)$, an intra-category position parameter $\beta$ and a negative correlation correction factor $\gamma$ of the feature word t with respect to each category;

using an improved formula to calculate an IMP_CHI value of an entry with respect to each category;

according to the improved chi-square statistics statistical formula, obtaining an IMP_CHI value of a feature word t with respect to the whole training text set; and after calculating IMP_CHI values of the whole training text set, selecting first M words as features represented by a document to form a final feature subset according to descending orders of the IMP_CHI values.

2. The text classification method based on feature selection according to claim 1, wherein the improved chi-square statistical formula is:

$$IMP\_CHI(t,c_i) = x^2(t,c_i) \times \alpha(t,c_j) \times \beta \times \gamma$$

where $\alpha(t,c_j)$ is a word frequency adjustment parameter, $\beta$ is an intra-category position parameter, $\gamma$ is a negative correlation correction factor, and $x^2(t,c_i)$ is a traditional chi-square statistical formula, which is expressed as:

$$x^2(t, c_i) = \frac{N \times (A \times D - C \times B)^2}{(A+C) \times (B+D) \times (A+B) \times (C+D)}$$

where N represents the total number of all texts in the training test set, A is a text belonging to the category $c_i$ and containing the feature word t, B is a text not belonging to the category $c_i$ and containing the feature t, C is a text belonging to the category $c_i$ and not containing the feature word t, and D is a text not belonging to the category $c_i$ and not containing the feature word t;

for multi-category problems, a statistical calculation method of the feature word with respect to the whole training text set is expressed as:

$$IMP\_CHI_{max}(t) = \max_{j=1}^{m}\{IMP\_CHI(t,c_j)\}$$

where m is the number of categories.

3. The text classification method based on feature selection according to claim 2, wherein a calculation formula of the word frequency adjustment parameter $\alpha(t,c_j)$ is as follows:

$$\alpha(t, c_j) = \frac{N}{n} \times \frac{tf(t, c_i)}{\sum_{i=1}^{n} tf(t, c_i)}$$

where N represents the total number of all texts in the training set, n represents the number of documents containing the feature word t in the text set, $tf(t,c_i)$ represents the number of occurrences in the text of the category $c_i$, $\sum_{i=1}^{N} tf(t,c_i)$ represents the number of all the occurrences in the documents of all categories, the word frequency adjustment parameter $\alpha(t,c_i)$ represents calculating a ratio of the number of word frequencies of the feature word in each category to the total number of word frequencies of the feature item in all categories, and the larger value $\alpha(t,c_i)$ represents that the feature word appears in a certain category of the text set more frequently and the ability to discriminate the corresponding categories is stronger;

a calculation formula of the intra-category position parameter $\beta$ is as follows:

$$\beta_j = \frac{1}{m}\sum_{j=1}^{m}\left[tf_j(t) - \frac{1}{m}\sum_{i=1}^{m} tf_j(t)\right]^2$$

which is normalized as:

$$\beta = 1 - \frac{\beta_j}{\sqrt{\sum_{j=1}^{m}\beta_j^2}}$$

where m represents the total number of the categories, and $tf_j(t)$ represents a word frequency of the feature word t in the category j;

a calculation formula of the negative correlation correction factor $\gamma$ is as follows:

$$\gamma = N(t, c_i) - \frac{\sum_{j=1}^{n} N(t, c_i)}{m}$$

where $N(t,c_i)$ is the number of texts in which the feature word t appears in the category $c_j$, $\sum_{j=1}^{n} N(t,c_i)$ is the total number of texts in which the feature word t appears in the text set, and m is the number of categories.

4. The text classification method based on feature selection according to claim 1, wherein TF-IWF algorithm is used to give the weights to the extracted feature entries, wherein a word frequency TF refers to a frequency that a certain entry $t_i$ appears in the document $d_j$, which is generally normalized, and a calculation process is as follows:

$$TF_{ij} = \frac{n_{i,j}}{\sum_{k} n_{k,j}}$$

where $n_{i,j}$ represents the number of occurrences of the entry $t_i$ in the document $d_j$, and $\sum_{k} n_{k,j}$ represents the total number of occurrences of all entries in the document $d_j$;

an inverse word frequency IWF refers to the reciprocal of the proportion of the total number of words to the total number of documents, and a calculation process is as follows:

$$IWF_i = \log \frac{\sum_{m} n_i t_i}{n_i t_i}$$

where $\sum_{m} n_i t_i$ represents the total number of entries $t_i$ appearing in all documents in the category m, and $n_i t_i$ represents the number of entries $t_i$ appearing in the document $d_j$;

the TF-IWF value $W_{i,j}$ is obtained by multiplying the value of the word frequency $TF_{ij}$ by the value of the inverse word frequency $IWF_i$, and the calculation formula is as follows:

$$W_{i,j}=TF_{ij}\times IWF_i.$$

5. A text classification system based on feature selection, comprising:
  a data acquisition module, which is configured to acquire a text classification data set;
  a pre-processing module, which is configured to divide the text classification data set into a training text set and a test text set, and then pre-process the training text set and the test text set;
  a Chi-square statistics module, which is configured to extract feature entries from the pre-processed training text set through an improved chi-square (IMP_CHI) statistical formula to form feature subsets;
  a weighting module, which is configured to use a Term Frequency-Inverse Word Frequency (TF-IWF) algorithm to give weights to the extracted feature entries;
  a modeling module, which is configured to, based on the weighted feature entries, establish a short text classification model based on a support vector machine; and
  a classification module, which is configured to classify the test text set by the short text classification model;
  wherein the pre-processing comprises first performing standard processing including removing stop words on a text, and then selecting Jieba word segmentation tool to segment the processed short text content to obtain the training text set and the test text set which have been segmented, and storing the training text set and the test text set in a text database;
  wherein extracting the feature entries from the pre-processed training text set through the improved chi-square statistical formula to form feature subsets comprises:
  extracting each feature word t and its related category information from the text database;
  calculating a word frequency adjustment parameter $\alpha(t, c_i)$, an intra-category position parameter $\beta$ and a negative correlation correction factor $\gamma$ of the feature word t with respect to each category,
  using an improved formula to calculate an IMP_CHI value of an entry with respect to each category;
  according to the improved chi-square statistics statistical formula, obtaining an IMP_CHI value of a feature word t with respect to the whole training text set; and
  after calculating IMP_CHI values of the whole training text set, selecting first M words as features represented by a document to form a final feature subset according to descending orders of the IMP_CHI values.

6. A non-transitory computer-readable storage medium on which a computer program is stored, wherein the program, when executed by a processor, implements the steps of a text classification method based on feature selection, wherein the method comprises:
  acquiring a text classification data set;
  dividing the text classification data set into a training text set and a test text set and then pre-processing the training text set and the test text set;
  extracting feature entries from the pre-processed training text set through an improved chi-square (IMP_CHI) statistical formula to form feature subsets;
  using a Term Frequency-Inverse Word Frequency (TF-IWF) algorithm to give weights to the extracted feature entries;
  based on the weighted feature entries, establishing a short text classification model based on a support vector machine; and
  classifying the pre-processed test text set by the short text classification model;
  wherein the pre-processing comprises first performing standard processing including removing stop words on a text, and then selecting Jieba word segmentation tool to segment the processed short text content to obtain the training text set and the test text set which have been segmented, and storing the training text set and the test text set in a text database;
  wherein extracting the feature entries from the pre-processed training text set through the improved chi-square statistical formula to form feature subsets comprises:
  extracting each feature word t and its related category information from the text database;
  calculating a word frequency adjustment parameter $\alpha(t, c_i)$, an intra-category position parameter $\beta$ and a negative correlation correction factor $\gamma$ of the feature word t with respect to each category;
  using an improved formula to calculate an IMP_CHI value of an entry with respect to each category;
  according to the improved chi-square statistics statistical formula, obtaining an IMP_CHI value of a feature word t with respect to the whole training text set; and
  after calculating IMP_CHI values of the whole training text set, selecting first M words as features represented by a document to form a final feature subset according to descending orders of the IMP_CHI values.

* * * * *